US012619566B2

(12) United States Patent
  Binet et al.

(10) Patent No.:  US 12,619,566 B2
(45) Date of Patent:  May 5, 2026

(54) SCALABLE CONFIGURABLE CHIP ARCHITECTURE

(71) Applicant: Motional AD LLC, Boston, MA (US)

(72) Inventors: Guillaume Binet, Pittsburgh, PA (US);
               Shailendra Deva, Saratoga, CA (US);
               Hsin-I Li, Wexford, PA (US); Olivia Leitermann, Somerville, MA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 18/139,526

(22) Filed: Apr. 26, 2023

(65) Prior Publication Data

US 2023/0342316 A1      Oct. 26, 2023

Related U.S. Application Data

(60) Provisional application No. 63/334,969, filed on Apr. 26, 2022.

(51) Int. Cl.
   *G06F 13/42*      (2006.01)
   *G06F 12/0831*    (2016.01)
   *G06F 13/38*      (2006.01)

(52) U.S. Cl.
   CPC ........ *G06F 13/382* (2013.01); *G06F 12/0831* (2013.01)

(58) Field of Classification Search
   None
   See application file for complete search history.

(56) References Cited

U.S. PATENT DOCUMENTS 8,599,001 B2    12/2013  Schofield et al.
9,511,878 B1    12/2016  McDermott et al.
          (Continued)

FOREIGN PATENT DOCUMENTS

DE      10325374      12/2004
DE   102018220820  A1    6/2019
          (Continued)

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.
          (Continued)

*Primary Examiner* — Farley Abad
*Assistant Examiner* — Dayton Lewis-Taylor
(74) *Attorney, Agent, or Firm* — Fish & Richardson P.C.

(57) ABSTRACT

Provided are systems and methods for a scalable configurable chip architecture. The system includes a first cluster and a second cluster multi-chip modules, and a data network coupling the first cluster to the second cluster. Each multi-chip module in the first cluster of multi-chip modules comprising a first plurality of chips coupled together by a first interconnect, each chip of the first plurality of chips configured to facilitate processing of at least one function of a first set of functions of an autonomous vehicle (AV). Each multi-chip module in the second cluster of multi-chip modules comprising a second plurality of chips coupled together by a second interconnect, each chip of the second plurality of chips configured to facilitate processing of at least one function of a second set of functions of the AV.

15 Claims, 12 Drawing Sheets

(56) References Cited

U.S. PATENT DOCUMENTS

| | | | |
|---|---|---|---|
| 10,678,253 | B2 | 6/2020 | Zeng et al. |
| 11,097,735 | B1 | 8/2021 | Marasigan et al. |
| 11,880,327 | B1 | 1/2024 | Nakibly et al. |
| 12,391,249 | B2 | 8/2025 | Adwan et al. |
| 2008/0082758 | A1 | 4/2008 | Pong |
| 2008/0177941 | A1 | 7/2008 | Yim et al. |
| 2010/0245066 | A1 | 9/2010 | Sarioglu et al. |
| 2012/0180068 | A1 | 7/2012 | Wein et al. |
| 2012/0210071 | A1 | 8/2012 | Black et al. |
| 2016/0202994 | A1* | 7/2016 | Swanson ............... G06F 9/4401 |
| | | | 713/1 |
| 2016/0313991 | A1 | 10/2016 | Wei et al. |
| 2017/0123872 | A1 | 5/2017 | Yigzaw et al. |
| 2017/0153635 | A1 | 6/2017 | Beck et al. |
| 2017/0217443 | A1 | 8/2017 | Baumeister et al. |
| 2017/0322875 | A1 | 11/2017 | Gschwind et al. |
| 2018/0060147 | A1 | 3/2018 | Freitag et al. |
| 2018/0107212 | A1 | 4/2018 | Baumgaertner |
| 2018/0159647 | A1 | 6/2018 | Nayyar et al. |
| 2019/0031042 | A1 | 1/2019 | Muller |
| 2019/0041950 | A1 | 2/2019 | Chynoweth et al. |
| 2019/0049958 | A1 | 2/2019 | Liu et al. |
| 2019/0237504 | A1 | 8/2019 | Abdelmoneum |
| 2019/0258251 | A1 | 8/2019 | Ditty et al. |
| 2019/0361456 | A1 | 11/2019 | Zeng et al. |
| 2020/0072969 | A1 | 3/2020 | Zaidi |
| 2020/0125858 | A1 | 4/2020 | Bauer et al. |
| 2020/0189596 | A1 | 6/2020 | Kang |
| 2020/0272149 | A1 | 8/2020 | Yoo et al. |
| 2020/0294180 | A1* | 9/2020 | Koker ....................... G06T 1/20 |
| 2020/0341134 | A1 | 10/2020 | Roger et al. |
| 2020/0371787 | A1 | 11/2020 | Gupta et al. |
| 2020/0409912 | A1 | 12/2020 | Dong et al. |
| 2021/0088647 | A1 | 3/2021 | Ingram et al. |
| 2021/0197814 | A1 | 7/2021 | Ha et al. |
| 2021/0232912 | A1 | 7/2021 | Sharma et al. |
| 2021/0278498 | A1 | 9/2021 | Nayyar et al. |
| 2021/0337117 | A1 | 10/2021 | Cai et al. |
| 2021/0390004 | A1 | 12/2021 | Kundu et al. |
| 2022/0017111 | A1 | 1/2022 | Lee |
| 2022/0092412 | A1 | 3/2022 | Srivastava et al. |
| 2022/0198180 | A1 | 6/2022 | Weaver |
| 2022/0227318 | A1 | 7/2022 | Kurokawa et al. |
| 2022/0261593 | A1 | 8/2022 | Yu et al. |
| 2022/0269910 | A1 | 8/2022 | Onzon et al. |
| 2023/0035972 | A1 | 2/2023 | Agyeman |
| 2023/0146647 | A1 | 5/2023 | Byeon et al. |
| 2023/0339499 | A1 | 10/2023 | Binet et al. |
| 2024/0005666 | A1 | 1/2024 | Wang |
| 2024/0080571 | A1 | 3/2024 | Wang et al. |
| 2024/0083464 | A1 | 3/2024 | Leitermann et al. |
| 2024/0116540 | A1 | 4/2024 | Wang et al. |
| 2024/0152178 | A1* | 5/2024 | Chaudhari ............ G06F 1/3237 |

FOREIGN PATENT DOCUMENTS

| | | |
|---|---|---|
| EP | 2881752 | 6/2015 |
| EP | 3418841 | 12/2018 |
| EP | 3480700 | 5/2019 |
| EP | 3628559 | 4/2020 |
| WO | WO 2019/013948 | 1/2019 |
| WO | WO 2020/210729 A1 | 10/2020 |

OTHER PUBLICATIONS

International Search Report and Written Opinion in International Appln. No. PCT/US2023/019844, mailed on Jun. 30, 2023, 14 pages.

International Search Report and Written Opinion in International Appln. No. PCT/US2023/020051, mailed on Jul. 11, 2023, 13 pages.

International Search Report and Written Opinion in International Appln. No. PCT/US2023/020059, mailed on Jul. 11, 2023, 22 pages.

International Search Report and Written Opinion in International Appln. No. PCT/US2023/020086, mailed on Jun. 23, 2023, 13 pages.

Qi et al., "PointNet: Deep Learning on Point Sets for 3D Classification and Segmentation," CoRR, Submitted on Dec. 2, 2016, arXiv:1612.00593v1, 19 pages.

Smith, "Universal Chiplet Interconnect Exspress (UCIe) Announced: Setting Standards for the Chiplet Ecosystem," Mar. 2, 2022, retrieved from URL<https://www.anandtech.com/show/17288/universal-chiplet-interconnect-express-ucie-announced-setting-standards-for-the-chiplet-ecosystem>, retrieved on Apr. 20, 2022, 10 pages.

International Search Report and Written Opinion in International Appln. No. PCT/US2023/020080, mailed on Jul. 25, 2023, 11 pages.

International Search Report and Written Opinion in International Appln. No. PCT/US2023/020073, mailed on Jul. 26, 2023, 16 pages.

International Preliminary Report on Patentability in International Appl. No. PCT/US2023/020059, mailed on Nov. 7, 2024, 18 pages.

International Preliminary Report on Patentability in International Appln. No. PCT/US2023/019844, mailed on Nov. 7, 2024, 9 pages.

International Preliminary Report on Patentability in International Appln. No. PCT/US2023/020051, mailed on Nov. 7, 2024, 7 pages.

International Preliminary Report on Patentability in International Appln. No. PCT/US2023/020073, mailed on Nov. 7, 2024, 12 pages.

International Preliminary Report on Patentability in International Appln. No. PCT/US2023/020080, mailed on Nov. 7, 2024, 8 pages.

International Preliminary Report on Patentability in International Appln. No. PCT/US2023/020086, mailed on Nov. 7, 2024, 9 pages.

Extended European Search Report in European Appln. No. 23797233.6, mailed on Jul. 10, 2025, 11 pages.

Extended European Search Report in European Appln. No. 23797162.7, mailed on Jul. 28, 2025, 9 pages.

Siewiorek et al., "Architecture of Fault-Tolerant Computers," Computer, Aug. 1984, 17(8):9-18.

* cited by examiner

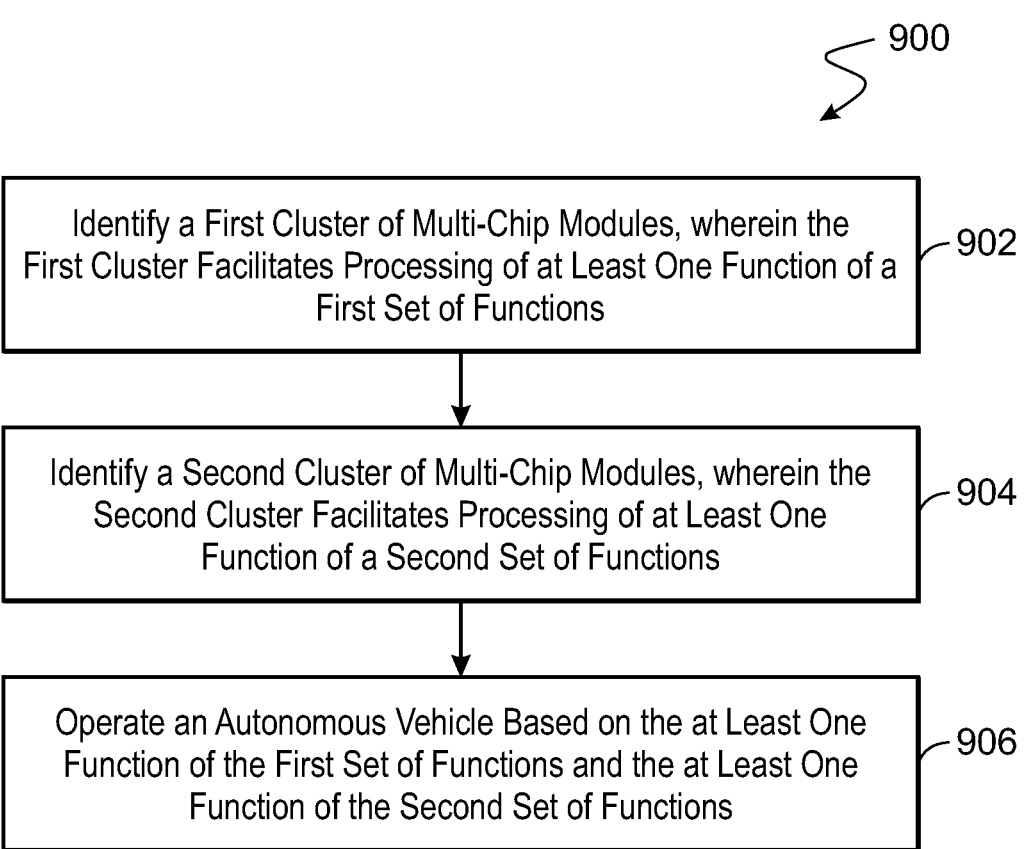

900

Identify a First Cluster of Multi-Chip Modules, wherein the First Cluster Facilitates Processing of at Least One Function of a First Set of Functions — 902

Identify a Second Cluster of Multi-Chip Modules, wherein the Second Cluster Facilitates Processing of at Least One Function of a Second Set of Functions — 904

Operate an Autonomous Vehicle Based on the at Least One Function of the First Set of Functions and the at Least One Function of the Second Set of Functions — 906

FIG. 9

SCALABLE CONFIGURABLE CHIP ARCHITECTURE

CROSS-REFERENCE TO RELATED APPLICATIONS

The present application claims the priority of U.S. Patent Application No. 63/334,969, filed on Apr. 26, 2022, entitled "Scalable Configurable Chip Architecture," which is herein incorporated by reference in its entirety.

BACKGROUND

Autonomous robotic systems, such as autonomous vehicles, rely on a suite of sensors to detect static or dynamic objects in a real-time operating environment. The detection of objects is typically performed by a perception subsystem of the autonomous robotic system that includes a neural network backbone for processing large amounts of two-dimensional (2D) and/or three-dimensional (3D) sensor data in real-time, and classifying and localizing the detected objects in the operating environment. The output of the perception subsystem is used by a planning system of the autonomous robotic system to plan a route through the operating environment. Because of the large amount of sensor data to be processed in real-time, existing distributed computing architectures are not able to meet the desired performance and safety requirements required for certain autonomous robotic systems, such as autonomous vehicles

BRIEF DESCRIPTION OF THE FIGURES

FIG. 9 is a process for establishing a scalable configurable chip architecture for autonomous systems.

DETAILED DESCRIPTION

Figure 1:
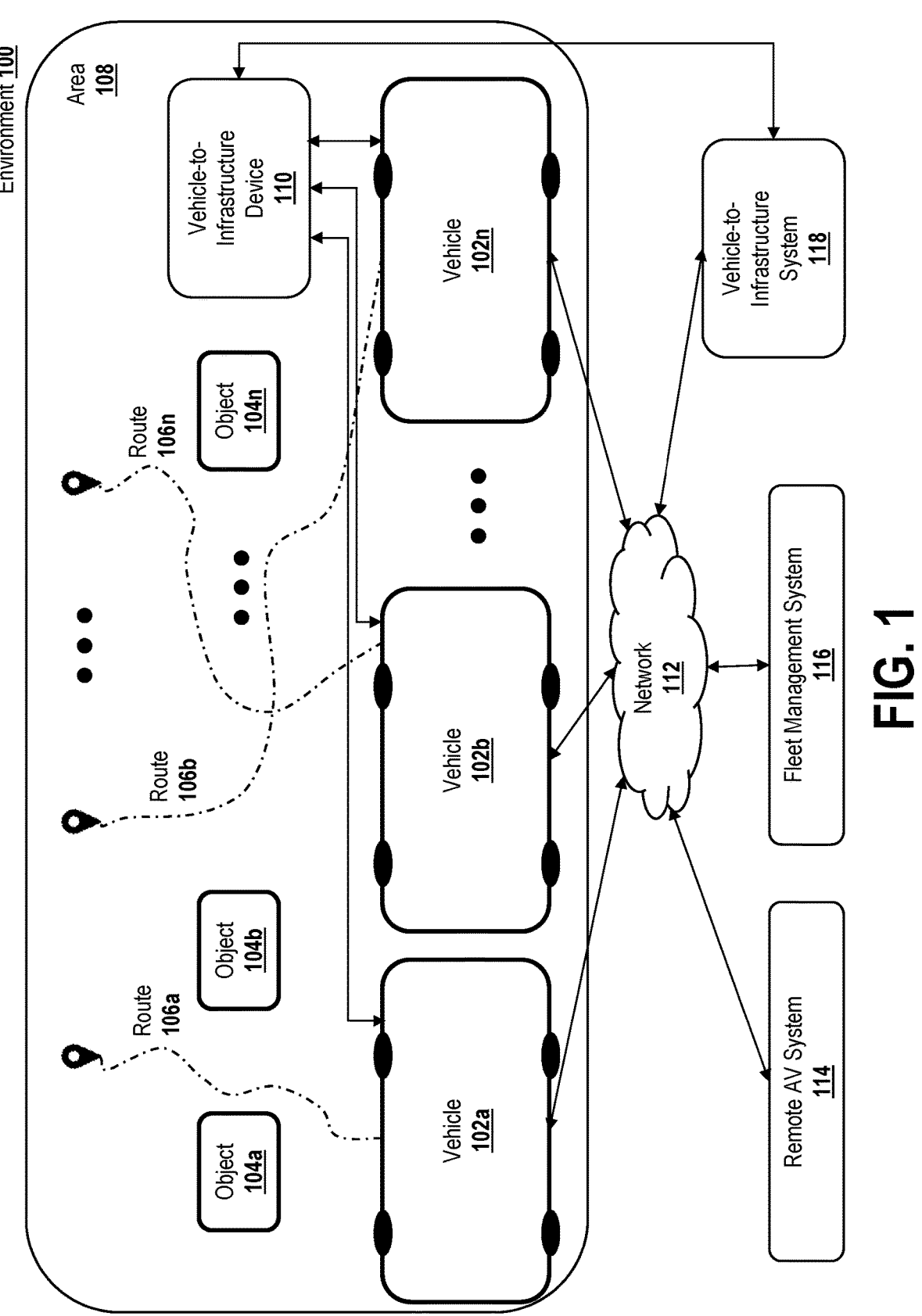
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

GENERAL OVERVIEW

In some aspects and/or embodiments, systems, methods, and computer program products described herein include and/or implement a scalable, configurable chip architecture. In examples, a system includes a first cluster of multi-chip modules and a second cluster of multi-chip modules. A data network couples the first cluster to the second cluster. Each multi-chip module in the first cluster of multi-chip modules includes a first plurality of chips coupled together by a first interconnect, and each chip of the first plurality of chips is configured to facilitate processing of at least one function of a first set of functions of an autonomous vehicle (AV). Each multi-chip module in the second cluster of multi-chip modules includes a second plurality of chips coupled together by a second interconnect, and each chip of the second plurality of chips is configured to facilitate processing of at least one function of a second set of functions of the AV.

By virtue of the implementation of systems, methods, and computer program products described herein, techniques for a scalable, configurable chip architecture are provided. The architecture as described herein enables a framework that is portable across vehicles operable at varying levels of automation. The architecture is distributed across multiple zones and functions of the AV. In examples, the cache coherency enables faster access to memory in a heterogeneous multiprocessor system. Each processor is able to access shared data without reliance on software based data management. Additionally, the cache coherency described herein is implemented using communications according to a high-speed serial computer expansion bus specifications. The cache coherency is transmitted across serial bus interconnects, avoiding modifications to serial bus interconnects. The present techniques enable cache coherency without specialized, modified interconnects.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
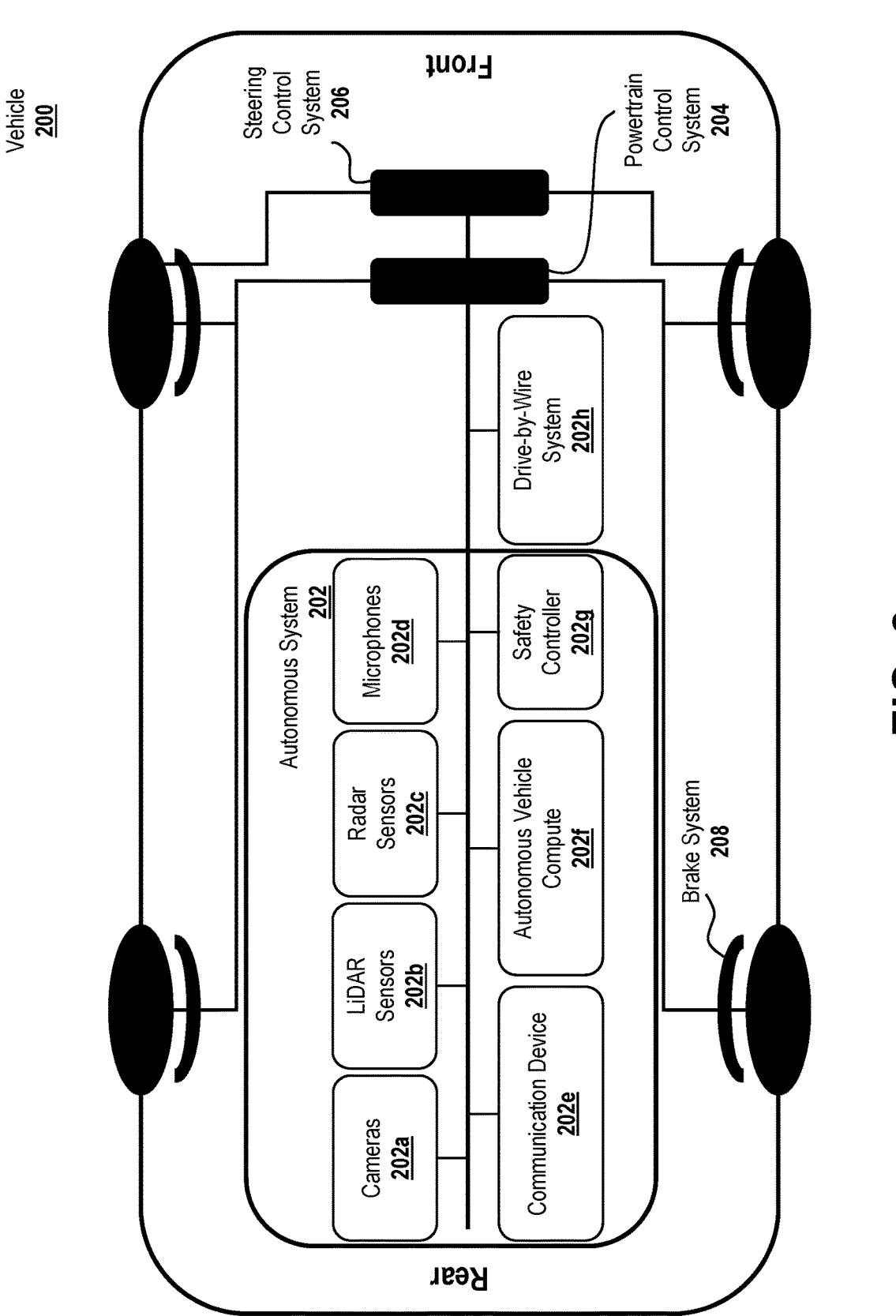
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that enables driver support functions and features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
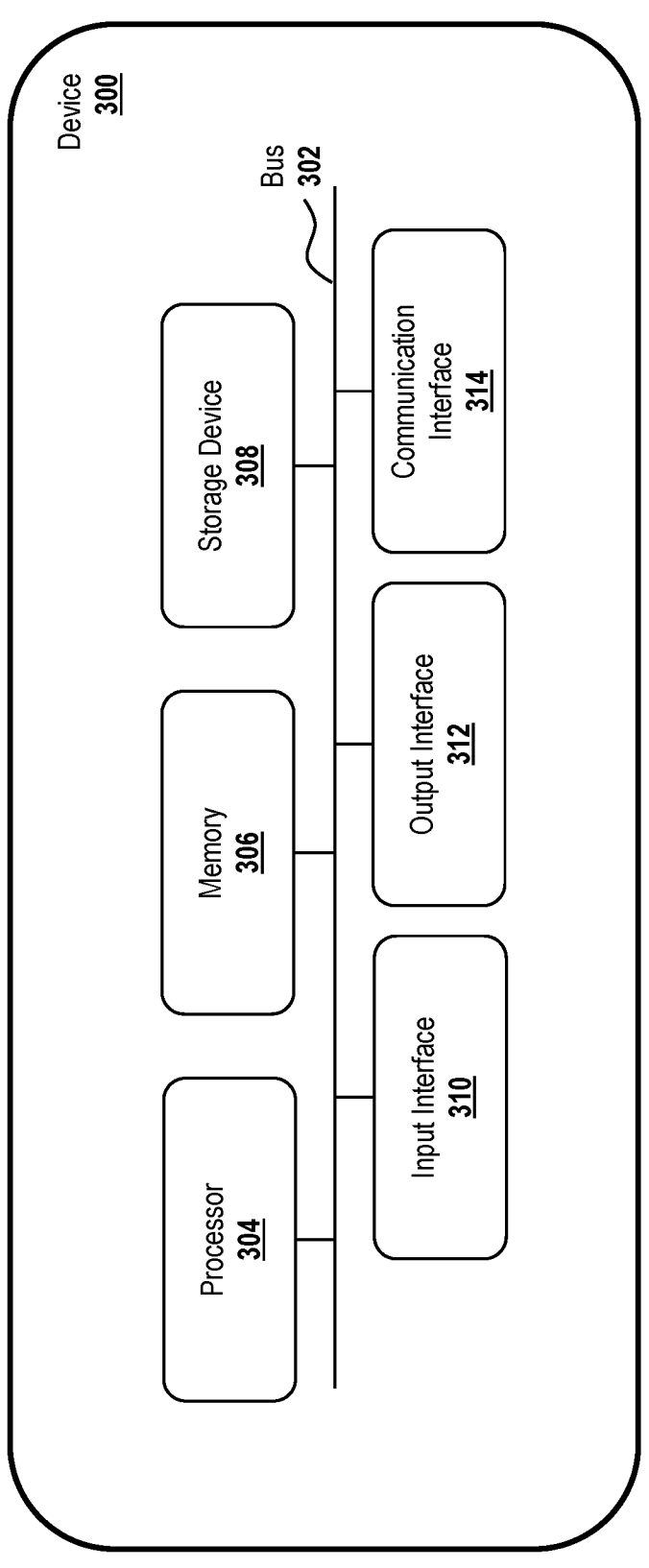
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102) and/or one or more devices of network 112 (e.g., one or more devices of a system of network 112). In some embodiments, one or more devices of vehicles 102 (e.g., one or more devices of a system of vehicles 102) and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), neural processing unit (NPU) and/or the like), a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), dynamic RAM (DRAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4A:
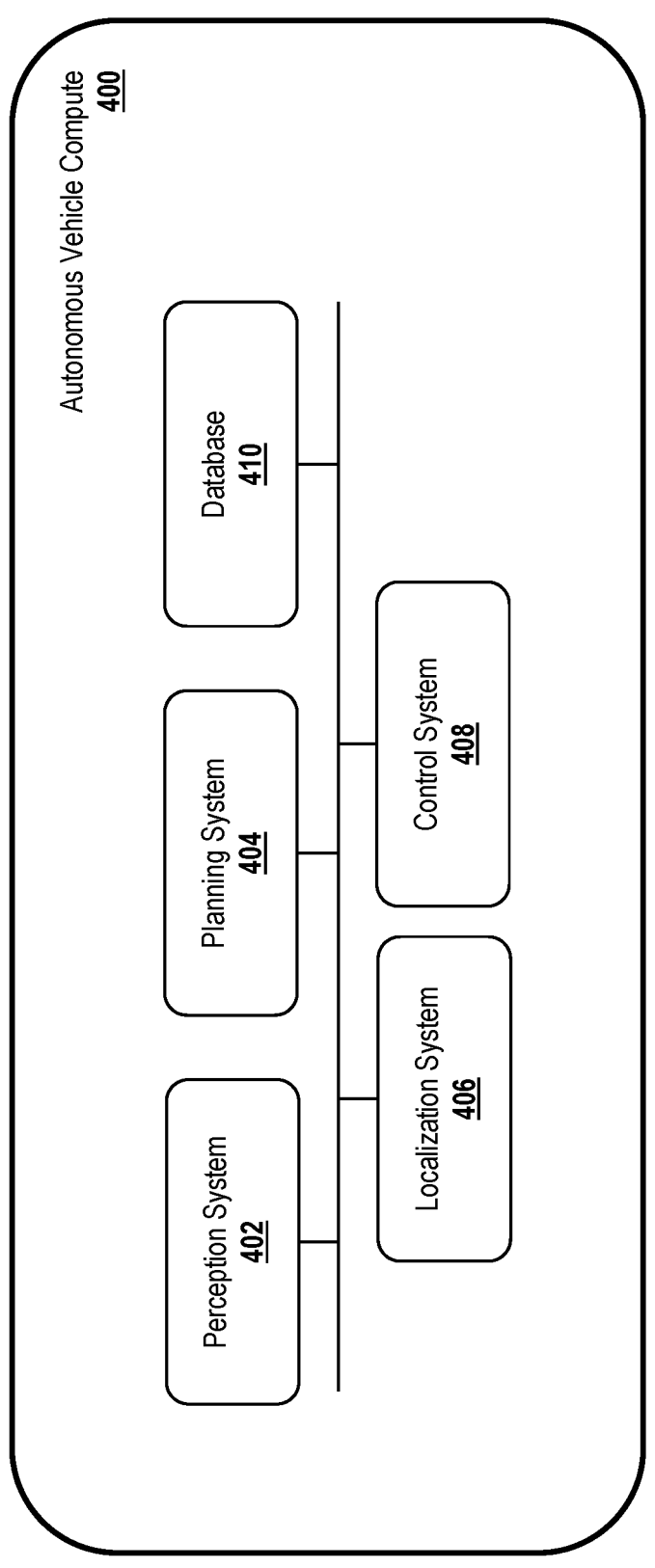
FIG. 4A is a diagram of certain components of an autonomous system.
Figure 4B:
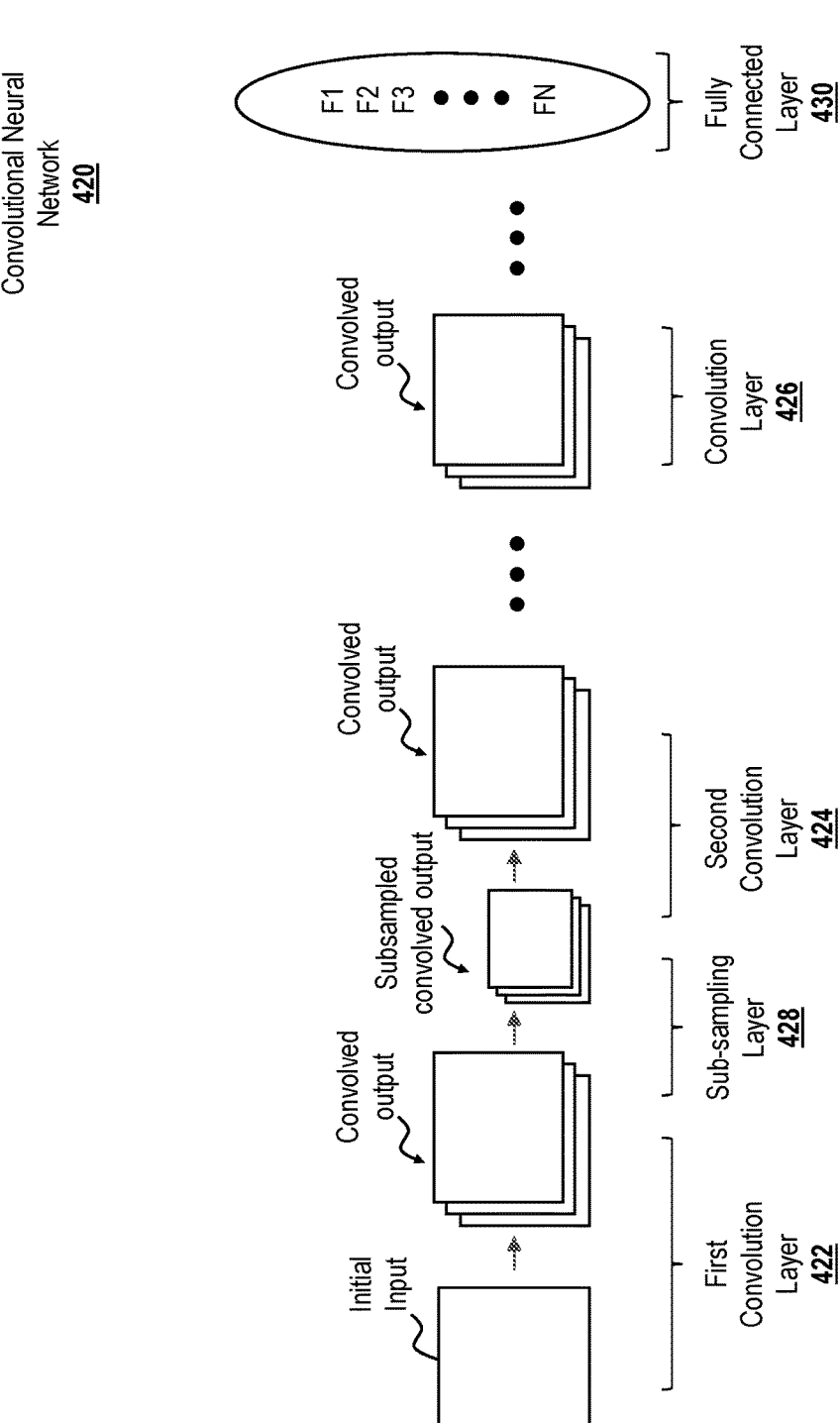
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
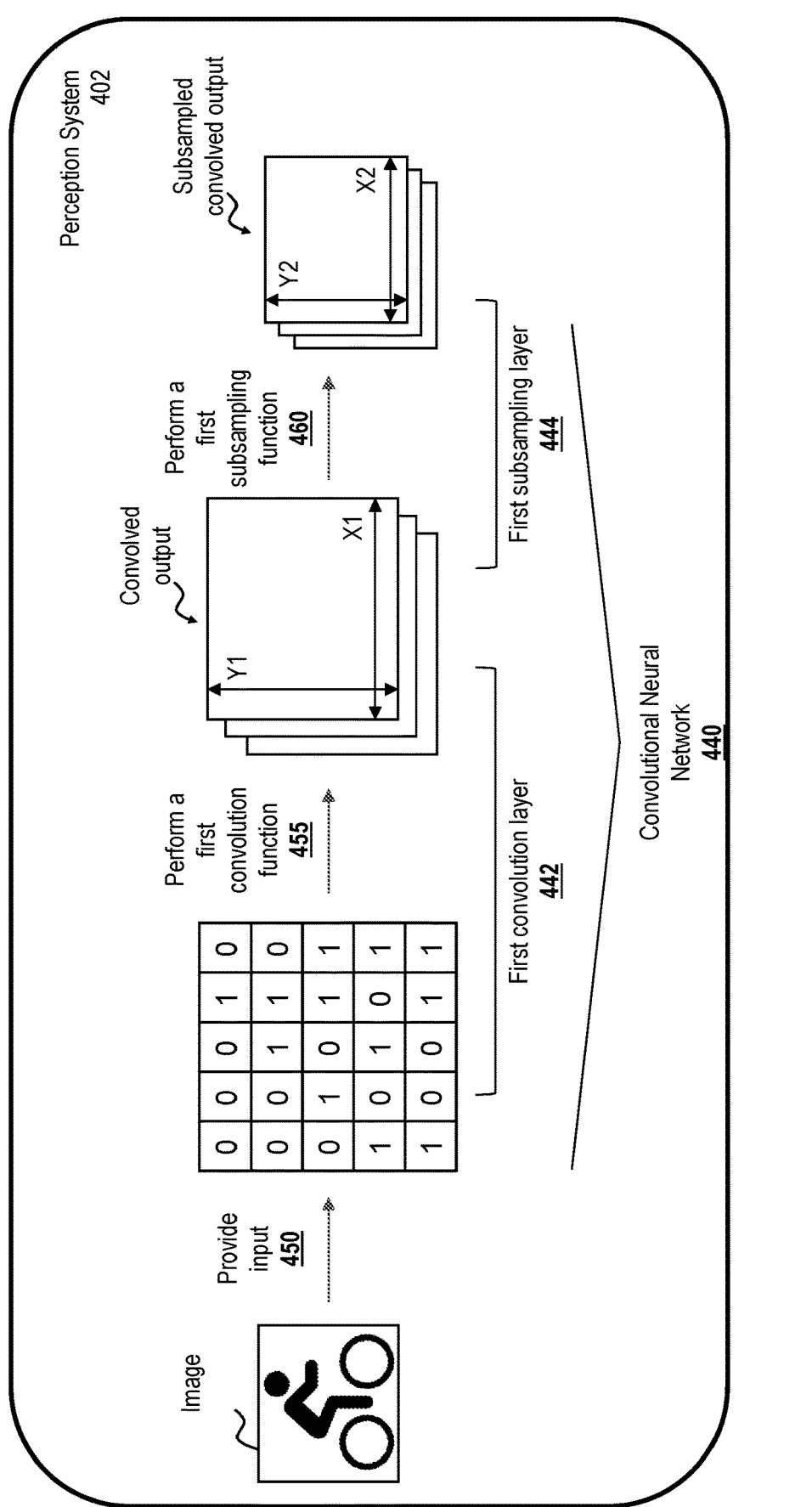
FIGS. 4C and 4D are a diagram illustrating example operation of a CNN.
Figure 4D:
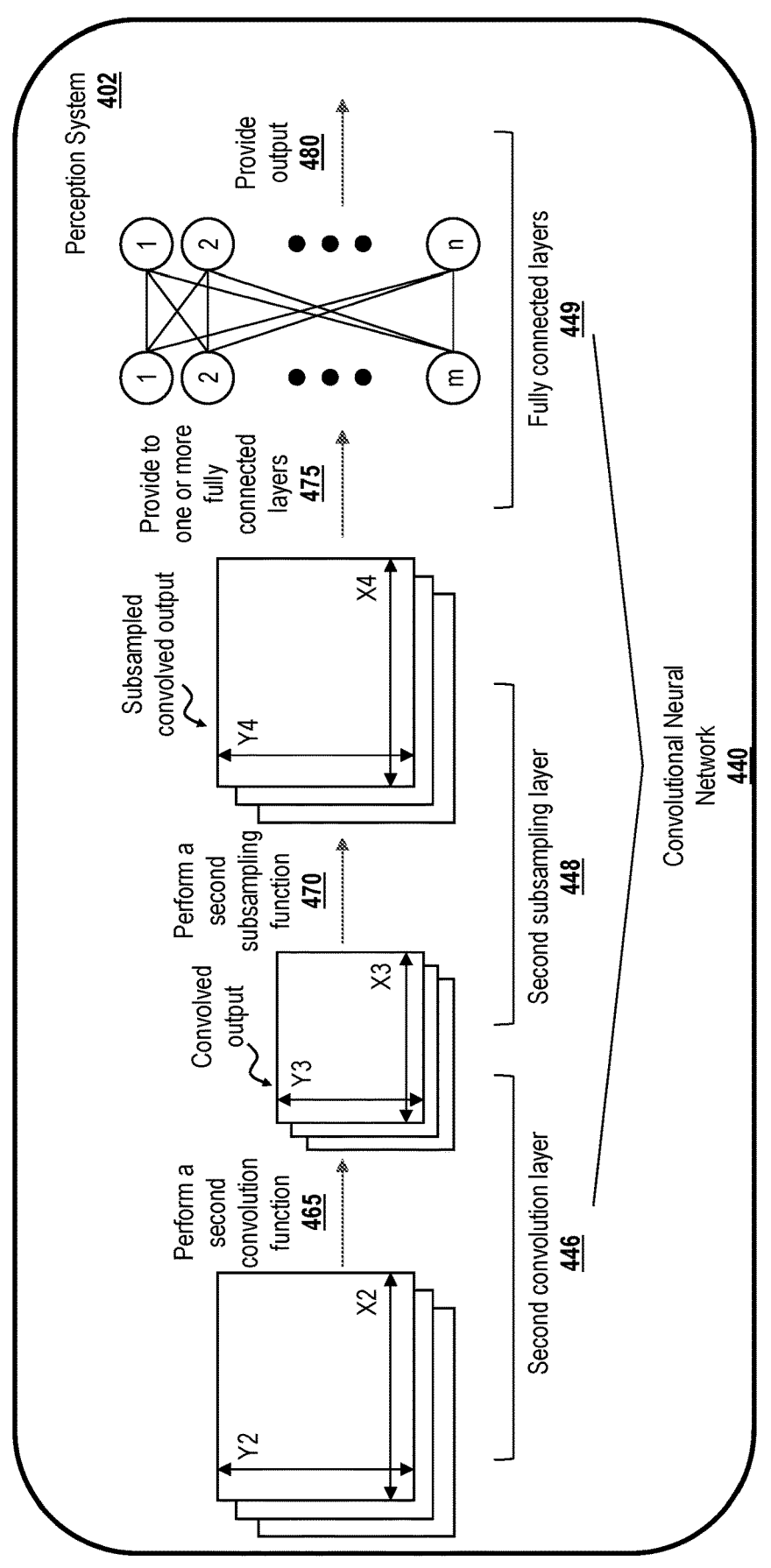

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output 480. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Figure 5:
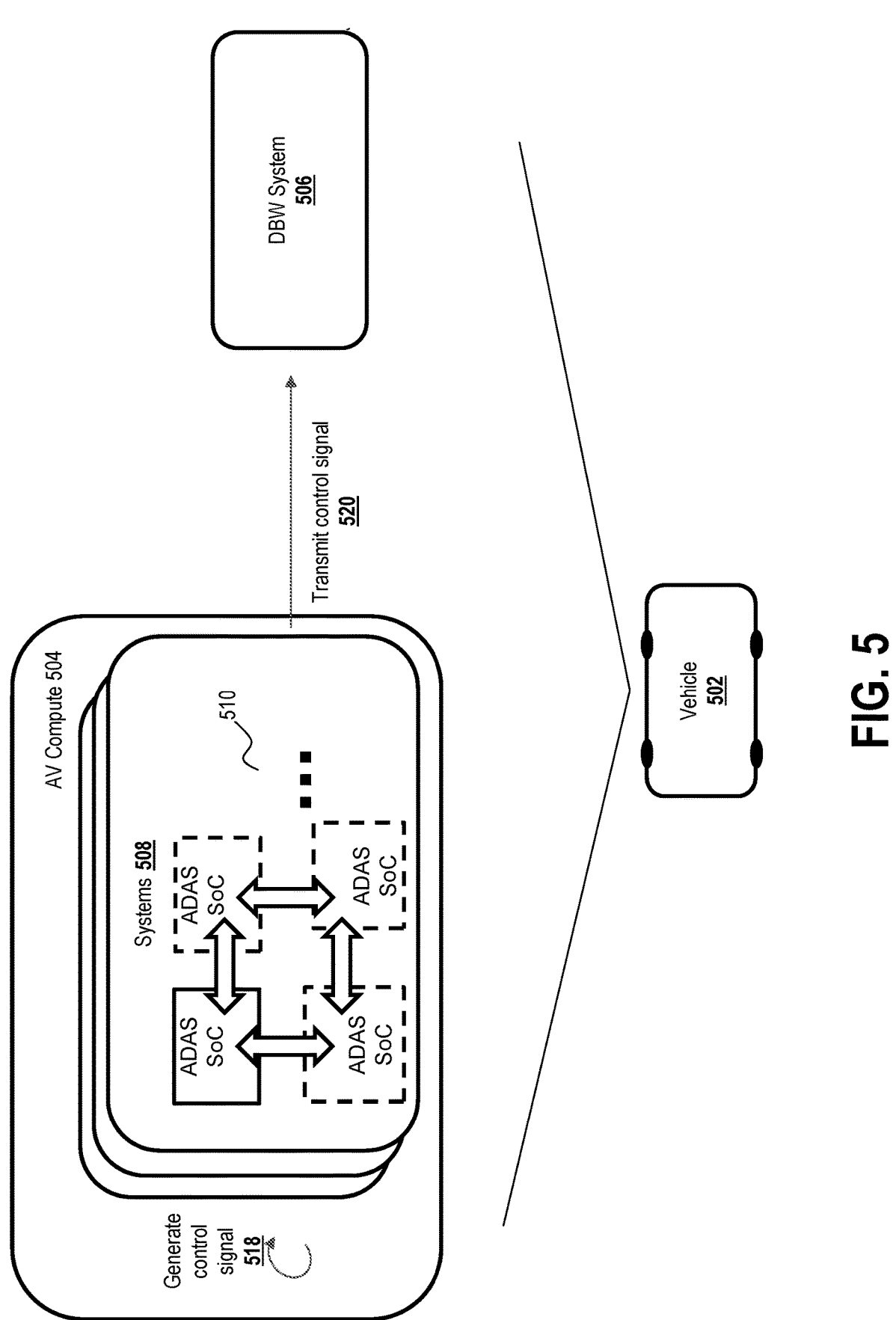
FIG. 5 is a diagram of a vehicle that includes a scalable configurable chip architecture.

Referring now to FIG. 5, illustrated is a diagram of a vehicle 502 that includes a scalable configurable chip architecture. In some embodiments, vehicle 502 includes an autonomous vehicle (AV) compute 504 and a drive-by-wire system 506. In some embodiments, vehicle 502 is the same as or similar to vehicle 200 of FIG. 2. In some embodiments, device 300 of FIG. 3 corresponds to at least one device of vehicles 502 (e.g., at least one device of a system 508 of vehicle 502). In some embodiments, the AV compute 504 is the same as or similar to autonomous vehicle compute 202f of FIG. 2 or autonomous vehicle compute 400 of FIG. 4. In some embodiments, the drive-by-wire system 506 is the same as or similar to the drive-by-wire (DBW) system 202h of FIG. 2.

Vehicles, such as vehicle 502, are operable at varying levels of automation. In examples, an advanced driver assistance system (ADAS) or autonomous vehicle (AV) system automates vehicle systems 508 by obtaining input data from multiple data sources, such as such as cameras 202a, LiDAR sensors 202b, radar sensors 202c, and microphones 202d described with respect to FIG. 2. In some embodiments, vehicle systems obtain data from more or fewer devices and/or different devices (e.g., ultrasonic sensors, inertial sensors, GPS receivers (discussed below), odometry sensors that generate data associated with an indication of a distance that vehicle has traveled, and/or the like). In some embodiments, systems 508 use the obtained data to generate data associated with environment. The data generated by the systems 508 is used by one or more systems described herein to observe the environment. In some embodiments, the data generated by the systems 508 is used to operate vehicle 502 either partially or fully operated without human intervention. As shown in FIG. 5, the systems 508 generate a control signal 518. The control signal is transmitted (520) to the drive-by-wire system 506, which in turn causes motion of the vehicle.

Systems 508 of the vehicle 502 include a scalable configurable chip architecture 510. In examples, the architecture is scalable according to a level of automation of the vehicle 502. Additionally, the drive-by-wire system 506, a powertrain control system (e.g., 204 of FIG. 2) and a steering control system (e.g., 206 of FIG. 2) can include a scalable configurable chip architecture. Automation refers to compute system control of dynamic driving tasks (DDTs) including steering, acceleration/deceleration, and monitoring of the environment (e.g., the vehicle, other objects, roadway). Automation also includes redundant, fallback performance of dynamic driving tasks and driving-mode specific execution of DDTs.

A scalable configurable chip architecture supports vehicle operation at low levels with no automation and at high levels with high automation and complete, or nearly complete, computer monitoring. Levels of automation vary according to the input data obtained from multiple data sources and processing power consumed to operate at each level of automation. For example, operation at low levels of automation can use fewer systems and devices when compared to operation at higher levels of automation. The scalable configurable chip architecture enables the addition of data sources and devices in an autonomous system that is portable across all levels of automation. In some embodiments, at least one System on Chip (SoC) of the scalable configurable chip architecture 510 operates to realize a function associated with a system 508. Additional SoCs are included in the systems 508 to provide additional processing and memory resources based on levels of automation associated with the vehicle 502. In some embodiments, the SoCs are advanced driver assistance system (ADAS) SoCs.

In some embodiments, the SoCs are communicatively coupled using a cache coherent fabric shown via block arrows (interconnects) that enable hardware-based cache coherence. In some embodiments, the cache coherent fabric is Cache Coherent Interconnect for Accelerators (CCIX). An example cache coherent fabric described in reference to FIG. 6. The cache coherent fabric includes at least one cache coherent interconnect that maintains data consistency without additional software management by various components or agents. Systems communicatively coupled using the cache coherent interconnect reside in a coherent domain.

Additionally, in some embodiments, the SOCs are communicatively coupled using at least one incoherent interconnect. Systems communicatively coupled using an incoherent interconnect reside in an incoherent domain. In examples, systems that transmit or receive data from caches in the incoherent domain use software management to maintain data consistency. The software management ensures that dirty data becomes visible to other systems in the incoherent domain.

Figure 6:
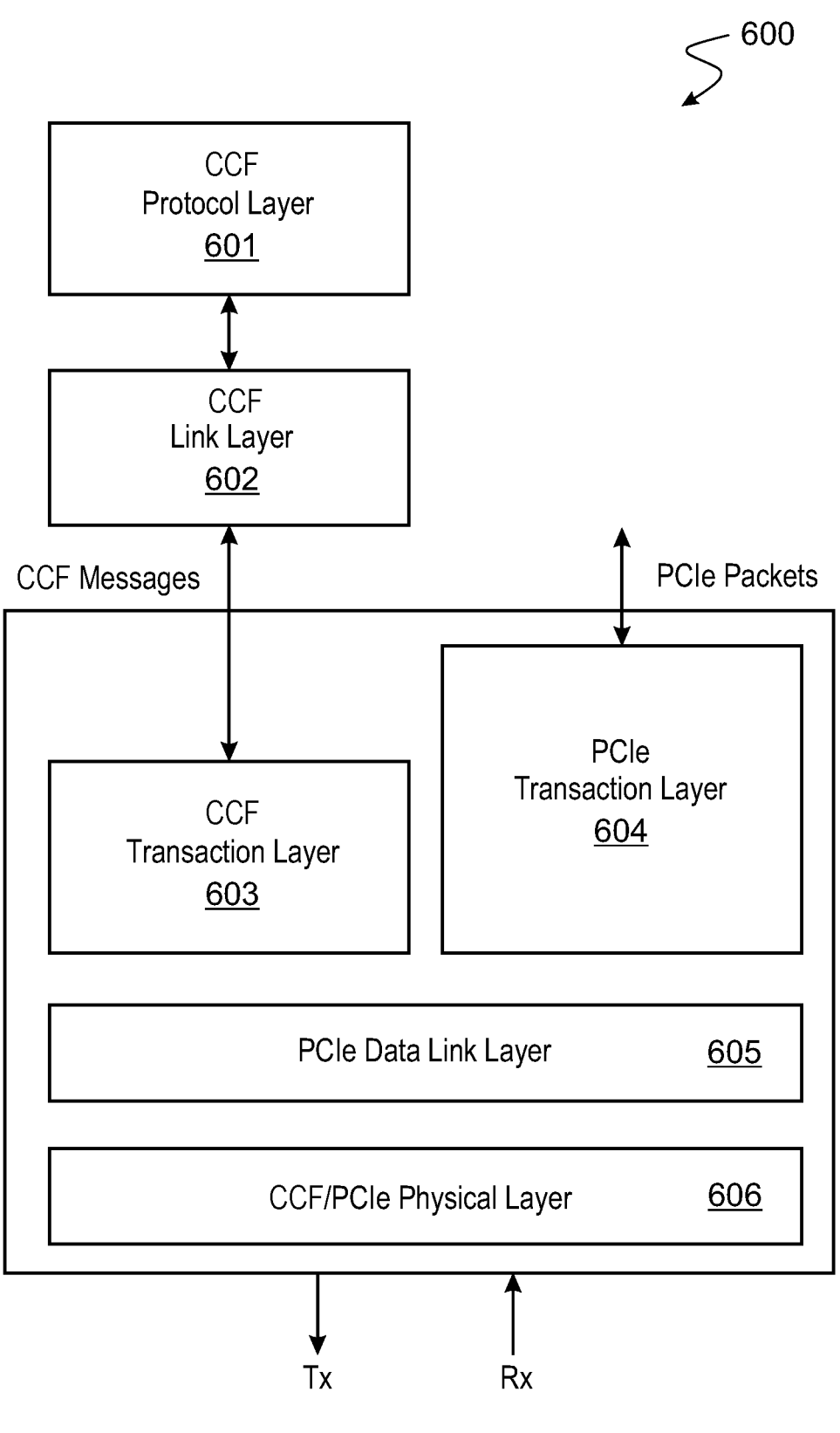
FIG. 6 illustrates an example cache coherent fabric software stack, according to an embodiment.

Referring to FIG. 6, a cache coherent fabric 600 is a layer-based architecture that expands on the base PCI Express® architecture. The cache coherent fabric 600 includes a cache coherent fabric (CCF) protocol layer 601, a CCF link layer 602, a CCF transaction layer 603, a PCIe transaction layer 604, a PCIe data link layer 605 and cache coherent fabric/PCIe physical layer 606.

The CCF protocol layer 601 enables a coherency protocol, including memory read and write flows. CCF layer 601 provides mapping for on-chip coherency protocols such as Arm® AMBA CHI. The cache states defined in CCF layer 601 enable hardware to determine the state of memory (e.g., determine if data is unique and clean or if it is shared and dirty).

The CCF link layer 602 is enables the formatting of cache coherent fabric traffic for a target transport. In addition, layer 602 manages port aggregation, enabling multiple ports to be aggregated together to increase bandwidth.

The CCF transaction layer 603 and PCIe transaction layer 604 enable handling of their respective packets. The PCIe protocol enables the implementation of virtual channels enabling different data streams to travel across a single PCIe link. By splitting cache coherent fabric traffic into one a first virtual channel and PCIe traffic into a second virtual channel, both cache coherent fabric and PCIe traffic share the same link.

PCIe data link layer 605 performs the functions of a data link layer, including but not limited to Cyclic Redundancy Code (CRC) error checking, packet acknowledgment and timeout checking, credit initialization and exchange, hash function checking, parity checking, or any combinations thereof. In examples, a hash function combines the message-passing capabilities of hash functions with security properties.

The CCF/PCIe physical layer 606 is a PCIe physical layer that extends the physical layer to support PCIe link speeds and provides backward support for various PCIe speeds plus extended speeds.

In some embodiments, other cache coherent fabrics can be used in the scalable configurable chip architecture (e.g., scalable configurable chip architecture 510 of FIG. 5), such as a CCIX, a Compute Express Link (CXL), or any combinations thereof. The CXL refers to an open standard for high-speed central processing unit (CPU)-to-device and CPU-to-memory connections. In some embodiments, the cache coherent fabric is based on a Universal Chiplet Interconnect Express (UCIe) standard.

In some embodiments, the cache coherent fabric enables communications between chips of a multi-chip module. In examples, an SoC is a multi-chip module that includes one or more chiplets. Chiplets integrate pre-developed dies in a single integrated circuit (IC) package. Additionally, chiplets enable execution of different functions at various nodes of a single IC package.

Figure 7:
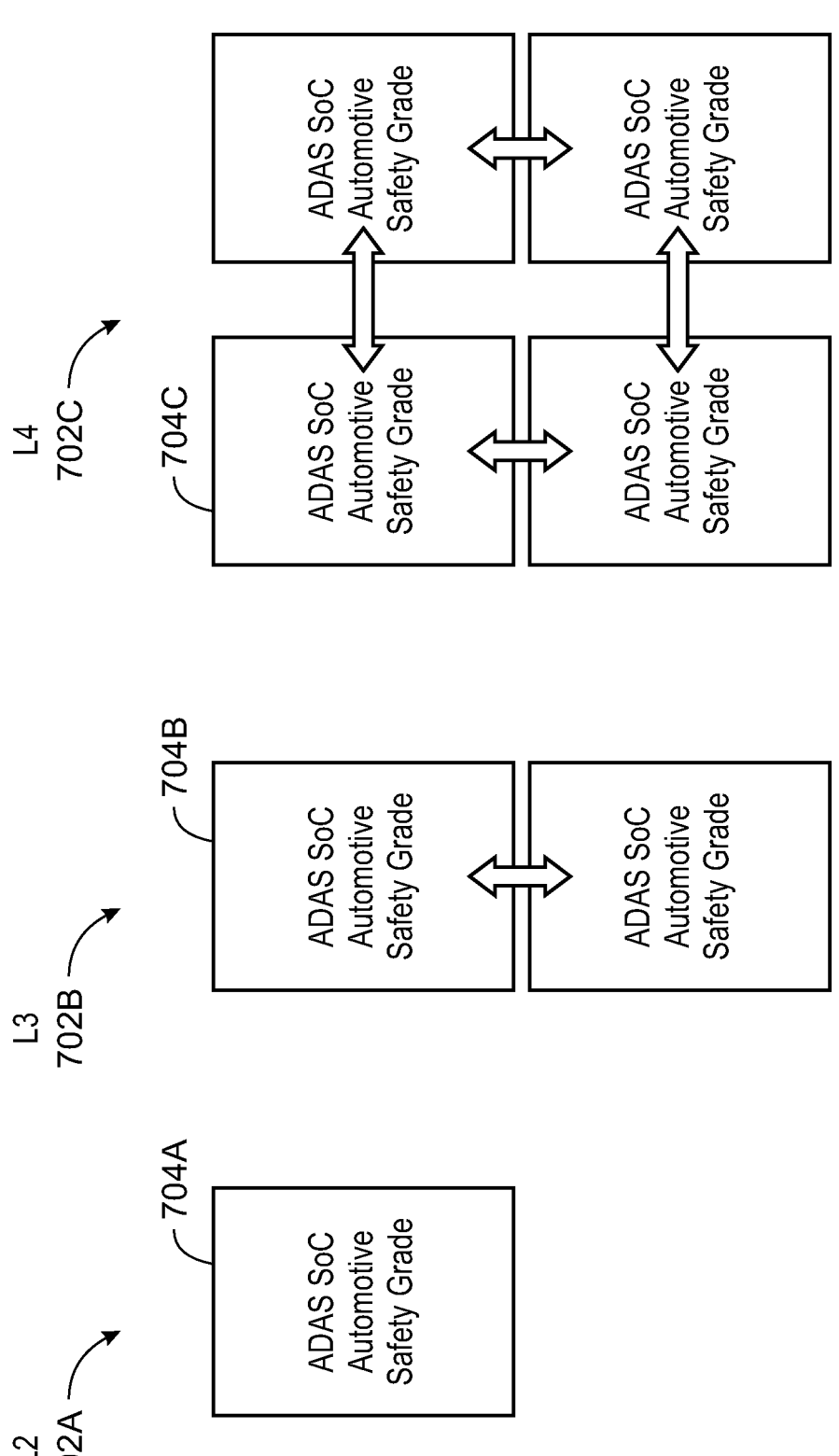
FIG. 7 is an illustration of a scalable configurable chip architecture.

FIG. 7 is an illustration of a scalable configurable chip architecture 700. For ease of illustration, three levels of automation 702A, 702B, and 702C are shown with three exemplary architectures 704A, 704B, and 704C. The three exemplary architectures are illustrated at different scales. The architectures are enabled via a cache coherent fabric, where interconnects are established as needed to support communication between SoCs.

In some embodiments, the levels of automation are according to SAE International's standard J3016: Taxonomy and Definitions for Terms Related to On-Road Motor Vehicle Automated Driving Systems. In examples, level 0 refers to a level of automation with full-time performance of all aspects of a dynamic driving task by a human driver. Level 0 can be enhanced by warning or intervention systems. In examples, level 1 refers to a level of automation with driving mode-specific execution by an autonomous system of either steering or acceleration/deceleration tasks using information about the driving environment and with the expectation that the human driver perform all remaining aspects of the dynamic driving task. In examples, level 2 refers to a level of automation with driving mode-specific execution of both steering and acceleration/deceleration tasks by the autonomous system using information about the driving environment and with the expectation that the human driver perform all remaining aspects of the dynamic driving task. In examples, level 3 refers to a level of automation with driving mode-specific performance by an autonomous system of all aspects of the dynamic driving task with the expectation that the human driver will respond appropriately to a request to intervene. In examples, level 4 refers to a level of automation with driving mode-specific performance by an autonomous system of all aspects of the dynamic driving task, even if a human driver does not respond appropriately to a request to intervene. In examples, level 5 refers to a level of automation with full-time performance by an autonomous system of all aspects of the dynamic driving task under all roadway and environmental conditions, including those managed by a human driver. In examples, processing and memory consumption increases as the level of automation increases from level 0 to level 5.

In some embodiments, a same compute architecture is used to realize multiple levels of automation, including but not limited to any combination of level 0, level 1, level 2, level 3, level 4, or level 5 as described above. In the example of FIG. 7, a scalable configurable architecture implements a same compute architecture, where additional hardware is added to support additional processing and memory resources consumed by an autonomous system with increased autonomous system tasks and monitoring. In the example of FIG. 7, a level 2 702A autonomous system includes an SoC (e.g., multi-chip module). The SoC includes a first plurality of chips coupled together by a first interconnect. In examples, the first plurality of chips is a first plurality of chiplets. In examples, the first interconnect is based on a cache coherent fabric as described with respect to FIG. 6. In examples, the first interconnect is based on CCIX. Chiplets are further described with respect to FIG. 8. Each chip of the first plurality of chips is configured to facilitate processing of at least one function of a first set of functions of a vehicle, such as an AV. In the example of FIG. 7, a level 3 702B autonomous system and a level 4 autonomous system include multiple SoCs (e.g., multi-chip modules).

In some embodiments, a first cluster of multi-chip modules and a second cluster of multi-chip modules is coupled via a data network. In examples, the clusters are homogeneous clusters. For example, in a homogenous cluster the hardware or software is the same or similar, and multi-chip modules of the cluster have the same or similar processing abilities. In examples, the clusters are heterogeneous clusters. For example, in a heterogeneous cluster the hardware or software is different, and multi-chip modules of the cluster have the different processing abilities. A data network transfers data between clusters of multi-chip modules. In some embodiments, a central computer is coupled to the data network. In examples, the network is an analog network. In examples, the data network is based on cache coherent fabric. In examples, the data network is an Ethernet network. Additionally, in examples a cache coherent fabric enables sharing of a memory space accessible by the SoCs. A shared memory space is kept current by routing packets across a multi-hop network according to a protocol established by the cache coherent fabric.

In some embodiments, each multi-chip module of the first cluster of multi-chip modules includes a first plurality of chips coupled together by a first interconnect. In examples, the first plurality of chips is a first plurality of chiplets. Each chip of the first plurality of chips is configured to facilitate processing of at least one function of a first set of functions of a vehicle. Further, in some embodiments, each multi-chip module of the second cluster of multi-chip modules includes a second plurality of chips coupled together by a second interconnect. In examples, the second plurality of chips is a second plurality of chiplets. Each chip of the second plurality of chips is configured to facilitate processing of at least one function of a second set of functions of a vehicle.

In some embodiments, the functions of the vehicle include DDTs such as steering and acceleration/deceleration. Functions of the vehicle include sensor data processing. In examples, sensor data processing includes processing a three-dimensional point cloud or video data. Functions of the vehicle also include monitoring the environment (e.g., the vehicle, other objects, roadway). In example, functions of the vehicle are performed via systems 508 of a vehicle 502 (FIG. 5). The systems can include, for example, a perception system (e.g., perception system 402 of FIG. 4), planning system (e.g., planning system 404 of FIG. 4), localization system (e.g., localization system 406 of FIG. 4), and control system (e.g., control system 408 of FIG. 4).

Figure 8:
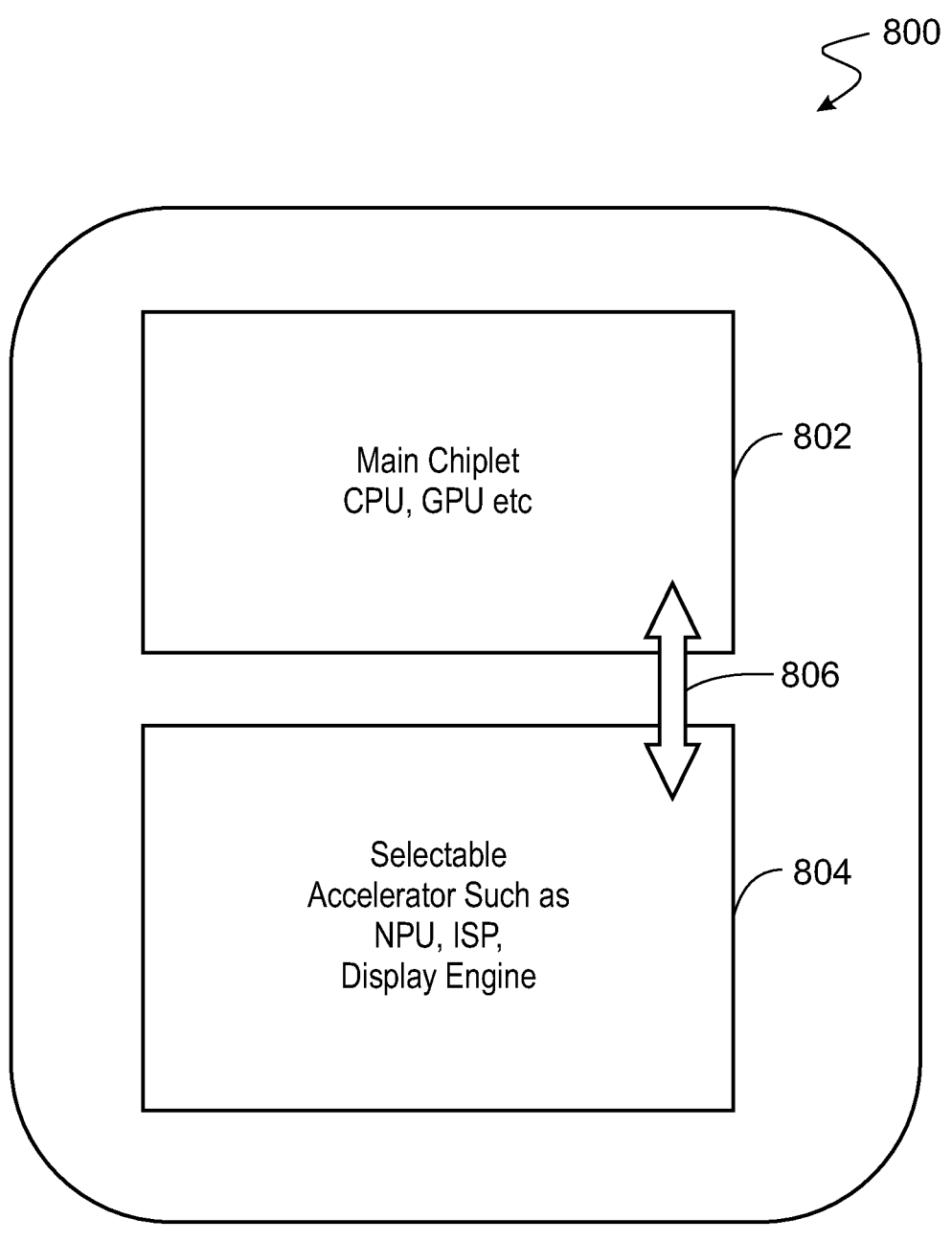
FIG. 8 is an illustration of a chip package with a plurality of chips.

FIG. 8 is an illustration of a chip package 800 with a plurality of chips. As shown in FIG. 8, the plurality of chips includes a first chiplet 802 and a second chiplet 804. The chiplet architecture enables scaling of an autonomous system based on a predetermined performance (e.g., level of automation). The first chiplet 802 and second chiplet 804 are coupled via an interconnect 806. In some embodiments, the first chiplet 802 is a main chiplet. For example, the main chiplet is a CPU, GPU etc. In examples, the main chiplet has CPU cores. In some embodiments, the second chiplet is a selectable accelerator, such as a neural processing unit (NPU), image signal processor (ISP), display engine, and the like. In examples, other chiplets in the chip package 800 enable extended functions. In some embodiments, the chiplets 802 and 804 communicate over the same fabric as IC package-to-package communications as described with respect to FIG. 7. For example, the interconnect 806 communicatively couples the chiplet 802 and the chiplet 804 according to a cache coherent fabric. Each chiplet enables function-based customization.

In some embodiments, a scalable configurable chip architecture is a three-tier distributed system. In examples, multi-chip modules are clustered according to a function or zone. A zone refers to a portion or area of a system, having a particular characteristic, purpose, or use, or subject to particular restrictions. For example, a zone refers to a physical area of a vehicle, such as front, back, left, right, etc. Additionally, in an example, a zone refers to a particular characteristic, such as components that capture data associated with the environment (e.g., external sensors), components that capture data associated with the interior areas of the vehicle (e.g., internal sensors), and the like. Data processing associated with the functions and zones is enabled by transmitting data using cache coherent interconnects.

In a first tier, multi-chip modules are clustered according to a function or zone. The clusters form a first distributed system tier, and the clusters communicate via a data network. Within each cluster, a second distribution system tier is formed from a plurality of multi-chip modules (e.g., SoCs). The multi-chip modules are communicatively coupled via a cache coherent fabric. Within each multi-chip module, a third distributed system tier is formed from a plurality of chips (e.g., chiplets). In examples, independent chiplets share messages with chiplets located on a same multi-chip module, chiplets located on a different multi-chip module in a same cluster, or chiplets located in a different multi-chip module in a different cluster. In some embodiments, the cache coherent fabric enables communication at each tier of the distributed system. Accordingly, the cache coherent fabric enables cache coherent communications between clusters (e.g., cluster-to-cluster), SoCs (e.g., SoC-to-SoC), and chiplets (e.g., chiplet-to-chiplet). Moreover, the cache coherent fabric according to the present techniques enables vertical scaling and horizontal scaling. Horizontal scaling refers to the addition of multi-chip modules (e.g., SoC) on a network. In some embodiments, the multiple chip modules are loosely coupled. Vertical scaling refers to the addition of chips within a single IC package.

Referring to FIG. 9, one or more of the steps described with respect to process 900 are performed (e.g., completely, partially, and/or the like) by autonomous system 500. Additionally, or alternatively, in some embodiments one or more steps described with respect to process 900 are performed (e.g., completely, partially, and/or the like) by another device or group of devices separate from or including autonomous system 500.

With continued reference to FIG. 9, at block 902 a first cluster of multi-chip modules is identified. Each multi-chip module in the first set cluster of multi-chip modules includes a first plurality of chips coupled together by a first interconnect, each chip of the first plurality of chips configured to facilitate processing of at least one function of a first set of functions of the vehicle (e.g., AV).

At block 904, a second cluster of multi-chip modules is identified. Each multi-chip module in the second set of multi-chip modules includes a second plurality of chips coupled together by a second interconnect, each chip of the second plurality of chips configured to facilitate processing of at least one function of a second set of functions of the vehicle.

At block 906, the first cluster of multi-chip modules and the second cluster of multi-chip modules are coupled by a data network. In some embodiments, the first interconnect, the second interconnect, and the data network form a cache coherent fabric.

According to some non-limiting embodiments or examples, provided is a system comprising: a first cluster of multi-chip modules, each multi-chip module in the first cluster of multi-chip modules comprising a first plurality of chips coupled together by a first interconnect, each chip of the first plurality of chips configured to facilitate processing of at least one function of a first set of functions of an autonomous vehicle (AV); a second cluster of multi-chip modules, each multi-chip module in the second cluster of multi-chip modules comprising a second plurality of chips coupled together by a second interconnect, each chip of the second plurality of chips configured to facilitate processing of at least one function of a second set of functions of the AV; and a data network coupling the first cluster to the second cluster.

According to some non-limiting embodiments or examples, provided is a vehicle, comprising a central computer; a first cluster of multi-chip modules, each multi-chip module in the first cluster of multi-chip modules comprising a first plurality of chips coupled together by a first interconnect, each chip of the first plurality of chips configured to facilitate processing of at least one function of a first set of functions of the vehicle; a second cluster of multi-chip modules, each multi-chip module in the second cluster of multi-chip modules comprising a second plurality of chips coupled together by a second interconnect, each chip of the second plurality of chips configured to facilitate processing of at least one function of a second set of functions of the vehicle; and a data network coupling the first cluster and the second cluster to the central computer.

According to some non-limiting embodiments or examples, provided is a method, comprising identifying, with at least one processor, a first cluster of multi-chip modules, wherein each multi-chip module in the first cluster of multi-chip modules comprises a first plurality of chips coupled together by a first interconnect, each chip of the first plurality of chips configured to facilitate processing of at least one function of a first set of functions of an autonomous vehicle; identifying, with the at least one processor, a second cluster of multi-chip modules, wherein each multi-chip module in the second cluster of multi-chip modules comprises a second plurality of chips coupled together by a second interconnect, each chip of the second plurality of chips configured to facilitate processing of at least one function of a second set of functions of the autonomous vehicle; and operating, with the at least one processor, the autonomous vehicle based on the at least one function of the first set of functions and the at least one function of the second set of functions.

Further non-limiting aspects or embodiments are set forth in the following numbered clauses:

Clause 1: A system including a first cluster of multi-chip modules, each multi-chip module in the first cluster of multi-chip modules comprising a first plurality of chips coupled together by a first interconnect, each chip of the first plurality of chips configured to facilitate processing of at least one function of a first set of functions of an autonomous vehicle (AV); a second cluster of multi-chip modules, each multi-chip module in the second cluster of multi-chip modules comprising a second plurality of chips coupled together by a second interconnect, each chip of the second plurality of chips configured to facilitate processing of at least one function of a second set of functions of the AV; and a data network coupling the first cluster to the second cluster.

Clause 2: The system of clause 1, comprising a central computer coupled to the data network.

Clause 3: The system of clauses 1 or 2, wherein at least one of the first set of functions or the second set of functions comprises sensor data processing.

Clause 4: The system of clause 3, wherein the sensor data processing comprises processing a three-dimensional point cloud or video data.

Clause 5: The system of any of clauses 1-4, wherein the first and second plurality of chips comprise chiplets and the first interconnect and the second interconnect are cache coherent fabric interconnects.

Clause 6: The system of any of clauses 1-5, wherein the first and second plurality of chips comprise chiplets and the first interconnect and the second interconnect are Ethernet.

Clause 7: The system of any of clauses 1-6, wherein the data network is Ethernet.

Clause 8: A vehicle, including a central computer; a first cluster of multi-chip modules, each multi-chip module in the first cluster of multi-chip modules comprising a first plurality of chips coupled together by a first interconnect, each chip of the first plurality of chips configured to facilitate processing of at least one function of a first set of functions of the vehicle; a second cluster of multi-chip modules, each multi-chip module in the second cluster of multi-chip modules comprising a second plurality of chips coupled together by a second interconnect, each chip of the second plurality of chips configured to facilitate processing of at least one function of a second set of functions of the vehicle; and a data network coupling the first cluster and the second cluster to the central computer.

Clause 9: The vehicle of clause 8, wherein the vehicle is divided into a plurality of zones, the first set of functions comprises processing sensor data from a first set of sensors located in a first zone of the vehicle, and the second set of functions comprises processing sensor data from a second set of sensors located in a second zone of the vehicle.

Clause 10: The vehicle of clauses 8 or 9, wherein at least one of the first set of functions or the second set of functions comprises sensor data processing.

Clause 11: The vehicle of clause 10, wherein the sensor data processing comprises processing a three-dimensional point cloud or video data.

Clause 12: The vehicle of any of clauses 8-11, wherein the first and second plurality of chips comprise chiplets and the first interconnect and the second interconnect are cache coherent fabric interconnects.

Clause 13: The vehicle of any of clauses 8-12, wherein the first and second plurality of chips comprise chiplets and the first interconnect and the second interconnect are Ethernet.

Clause 14: The vehicle of any of clauses 8-13, wherein the data network is Ethernet.

Clause 15: A method, including identifying, with at least one processor, a first cluster of multi-chip modules, wherein each multi-chip module in the first cluster of multi-chip modules comprises a first plurality of chips coupled together by a first interconnect, each chip of the first plurality of chips configured to facilitate processing of at least one function of a first set of functions of an autonomous vehicle; identifying, with the at least one processor, a second cluster of multi-chip modules, wherein each multi-chip module in the second cluster of multi-chip modules comprises a second plurality of chips coupled together by a second interconnect, each chip of the second plurality of chips configured to facilitate processing of at least one function of a second set of functions of the autonomous vehicle; and operating, with the at least one processor, the autonomous vehicle based on the at least one function of the first set of functions and the at least one function of the second set of functions.

Clause 16: The method of clause 15, wherein the first plurality of chips corresponds to a first zone of the autonomous vehicle and the second plurality of chips corresponds to a second zone of the autonomous vehicle.

Clause 17: The method of clauses 15 or 16, wherein the at least one function of the first set of functions of the autonomous vehicle is a dynamic driving task.

Clause 18: The method of any of clauses 15-17, wherein the at least one function of the second set of functions of the autonomous vehicle are driver support functions of an advanced driver assistance system.

Clause 19: The method of any of clauses 15-18, wherein the at least one function of the first set of functions or the at least one function of the second set of functions comprises sensor data processing.

Clause 20: The method of any of clauses 15-20, wherein data processing associated with the at least one function of the first set of functions and the at least one function of the second set of functions is enabled by transmitting data using cache coherent interconnects.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A system comprising:
a first cluster of multi-chip modules, each multi-chip module in the first cluster of multi-chip modules comprising a first plurality of chiplets coupled together by a first interconnect, each chiplet of the first plurality of chiplets configured to facilitate processing of at least one function of a first set of functions of an autonomous vehicle (AV);
a second cluster of multi-chip modules, each multi-chip module in the second cluster of multi-chip modules comprising a second plurality of chiplets coupled together by a second interconnect, each chiplet of the second plurality of chiplets configured to facilitate processing of at least one function of a second set of functions of the AV; and
a data network coupling the first cluster to the second cluster, wherein the first interconnect and the second interconnect are cache coherent fabric interconnects.

2. The system of claim 1, comprising a central computer coupled to the data network.

3. The system of claim 1, wherein at least one of the first set of functions or the second set of functions comprises sensor data processing.

4. The system of claim 3, wherein the sensor data processing comprises processing a three-dimensional point cloud or video data.

5. The system of claim 1, wherein the data network is an Ethernet network.

6. A vehicle, comprising:
a central computer;
a first cluster of multi-chip modules, each multi-chip module in the first cluster of multi-chip modules comprising a first plurality of chiplets coupled together by a first interconnect, each chiplet of the first plurality of chiplets configured to facilitate processing of at least one function of a first set of functions of the vehicle;
a second cluster of multi-chip modules, each multi-chip module in the second cluster of multi-chip modules comprising a second plurality of chiplets coupled together by a second interconnect, each chiplets of the second plurality of chiplets configured to facilitate processing of at least one function of a second set of functions of the vehicle; and
a data network coupling the first cluster and the second cluster to the central computer, wherein the first interconnect and the second interconnect are cache coherent fabric interconnects.

7. The vehicle of claim 6, wherein the vehicle is divided into a plurality of zones, the first set of functions comprises processing sensor data from a first set of sensors located in a first zone of the vehicle, and the second set of functions comprises processing sensor data from a second set of sensors located in a second zone of the vehicle.

8. The vehicle of claim 6, wherein at least one of the first set of functions or the second set of functions comprises sensor data processing.

9. The vehicle of claim 8, wherein the sensor data processing comprises processing a three-dimensional point cloud or video data.

10. The vehicle of claim 6, wherein the data network is an Ethernet network.

11. A method, comprising:
identifying, with at least one processor, a first cluster of multi-chip modules, wherein each multi-chip module in the first cluster of multi-chip modules comprises a first plurality of chiplets coupled together by a first interconnect, each chiplet of the first plurality of chiplets configured to facilitate processing of at least one function of a first set of functions of an autonomous vehicle;
identifying, with the at least one processor, a second cluster of multi-chip modules, wherein each multi-chip module in the second cluster of multi-chip modules comprises a second plurality of chiplets coupled together by a second interconnect, each chiplet of the second plurality of chiplets configured to facilitate processing of at least one function of a second set of functions of the autonomous vehicle; and
operating, with the at least one processor, the autonomous vehicle based on the at least one function of the first set of functions and the at least one function of the second set of functions, wherein data processing associated with the at least one function of the first set of functions and the at least one function of the second set of functions is enabled by transmitting data using cache coherent interconnects.

12. The method of claim 11, wherein the first plurality of chiplets corresponds to a first zone of the autonomous vehicle and the second plurality of chips corresponds to a second zone of the autonomous vehicle.

13. The method of claim 11, wherein the at least one function of the first set of functions of the autonomous vehicle is a dynamic driving task.

14. The method of claim 11, wherein the at least one function of the second set of functions of the autonomous vehicle are driver support functions of an advanced driver assistance system.

15. The method of claim 11, wherein the at least one function of the first set of functions or the at least one function of the second set of functions comprises sensor data processing.

* * * * *